United States Patent
Fan et al.

(10) Patent No.: US 9,043,817 B2
(45) Date of Patent: May 26, 2015

(54) SYSTEM AND METHOD OF MEASUREMENT DATA AND BACK-UP CHANNEL SERVICES

(75) Inventors: James Fan, San Ramon, CA (US); Jennifer K. Lam, Fremont, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 786 days.

(21) Appl. No.: 12/834,872

(22) Filed: Jul. 12, 2010

(65) Prior Publication Data

US 2012/0011527 A1  Jan. 12, 2012

(51) Int. Cl.
| | |
|---|---|
| *H04H 60/33* | (2008.01) |
| *H04N 7/18* | (2006.01) |
| *H04W 24/08* | (2009.01) |
| *H04N 21/442* | (2011.01) |
| *H04H 60/64* | (2008.01) |
| *H04H 60/82* | (2008.01) |

(52) U.S. Cl.
CPC ......... *H04W 24/08* (2013.01); *H04N 21/44231* (2013.01); *H04H 60/64* (2013.01); *H04H 60/82* (2013.01)

(58) Field of Classification Search
CPC .............................................. H04N 21/44231

USPC ....................................................... 725/10, 80
See application file for complete search history.

(56) References Cited

U.S. PATENT DOCUMENTS

| | | | |
|---|---|---|---|
| 2003/0126593 A1* | 7/2003 | Mault | 725/10 |
| 2003/0130595 A1 | 7/2003 | Mault | |
| 2003/0208110 A1* | 11/2003 | Mault et al. | 600/300 |
| 2007/0100243 A1 | 5/2007 | Lam et al. | |
| 2008/0109188 A1 | 5/2008 | Nakagawa et al. | |
| 2010/0016683 A1* | 1/2010 | Lemmers et al. | 600/301 |
| 2010/0070867 A1* | 3/2010 | Lemmers | 715/735 |

* cited by examiner

*Primary Examiner* — Nasser Goodarzi
*Assistant Examiner* — Michael Hong
(74) *Attorney, Agent, or Firm* — Guntin & Gust, PLC; Jay H. Anderson

(57) ABSTRACT

A system that incorporates teachings of the present disclosure may include, for example, a set top box (STB) comprising a controller programmed to receive measurement data stored in a first wireless device serving as a portable monitoring gateway that collects subscriber collected data and store and analyze the measurement data at the STB using the received measurement data received from the first wireless device and optionally from a remote server or a local storage space having stored measurement data to provide analyzed results. Other embodiments are disclosed.

20 Claims, 7 Drawing Sheets

600

700

SYSTEM AND METHOD OF MEASUREMENT DATA AND BACK-UP CHANNEL SERVICES

FIELD OF THE DISCLOSURE

The present disclosure relates generally to communication systems and more specifically to a system and method of measurement data and back-up channel services.

BACKGROUND

Interactive TV networks provide a multitude of services including broadcast programming and video-on-demand. These networks reach out to users in various environments including single family residences, multi-dwelling apartments and commercial facilities. The types of service and the ability to provide those services are often dependent on the particular environment of the potential users.

Personal medical devices and fitness equipment with built-in sensors and wireless chips are getting more popular each day. A variety of these devices are in the market performing different functions. Most of these devices can hold measurement data from hours to a few days and storage and processing of such data is typically cumbersome.

DETAILED DESCRIPTION

One embodiment of the present disclosure can entail a non-transitory computer readable storage medium comprising computer instructions to receive measurement data stored in a first wireless device serving as a portable monitoring gateway that collects subscriber collected data, analyze the measurement data at the STB using the received measurement data received from the first wireless device and optionally from a remote server or a local storage space having stored measurement data to provide analyzed results, and present the analyzed results at the STB.

Another embodiment of the present disclosure can entail a set top box (STB) comprising a controller programmed to receive measurement data stored in a first wireless device serving as a portable monitoring gateway that collects subscriber collected data and further programmed to store and analyze the measurement data at the STB using the received measurement data received from the first wireless device and optionally from a remote server or a local storage space having stored measurement data to provide analyzed results.

Yet another embodiment of the present disclosure can entail a network device comprising a controller programmed to receive measurement data from a set top box (STB) previously stored in a first wireless device serving as a portable monitoring gateway that collects subscriber collected data, analyze the measurement data and any previously aggregated data at the network device to create analyzed results and send the analyzed results to the STB.

Figure 1:
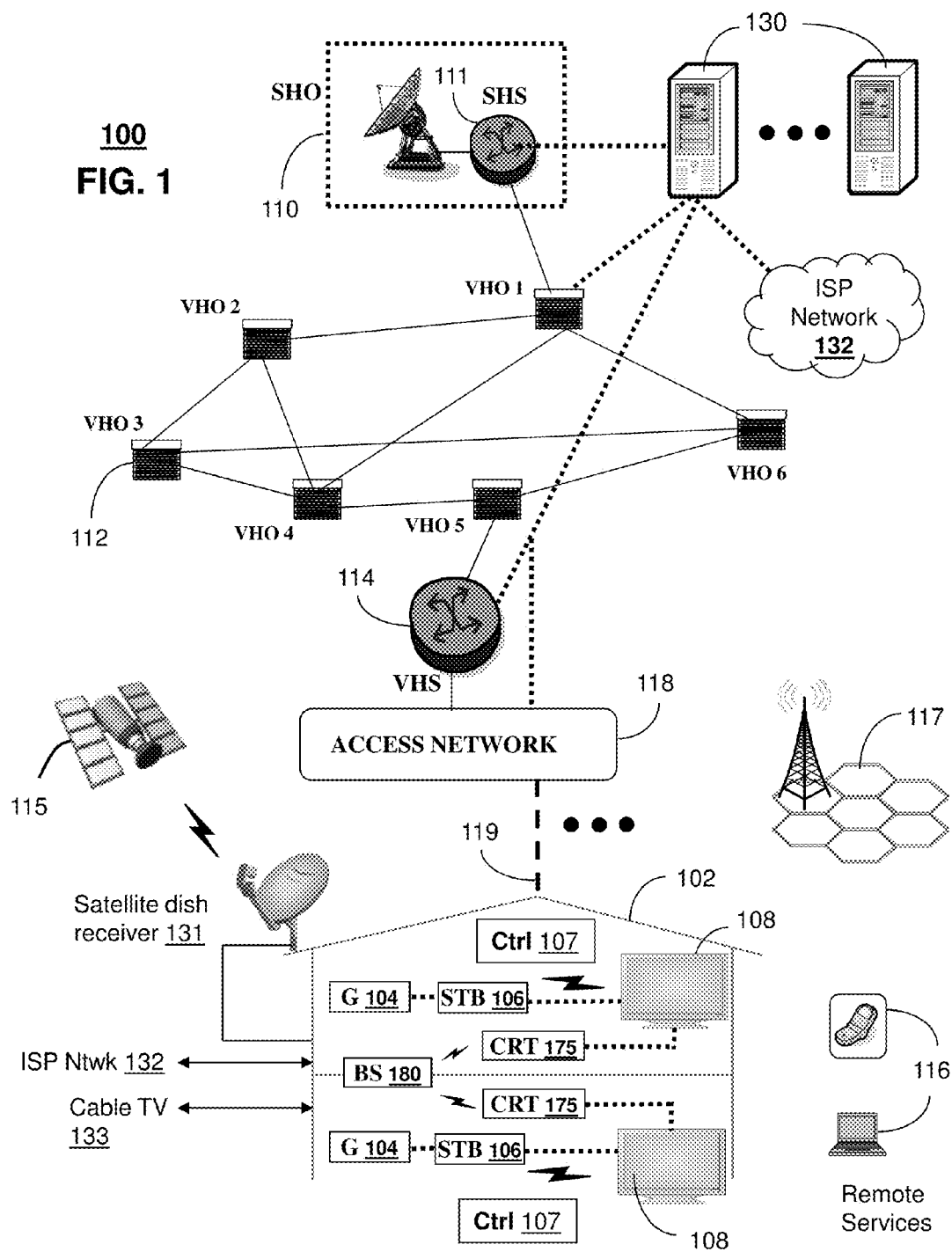
FIG. 1 depicts an illustrative embodiment a of communication system that provides program retrieval services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The building 102 can be various types including multi-dwelling units which house a plurality of different subscribers. The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the computing devices 130 can function as a server (herein referred to as server 130). The server 130 can use common computing and communication technology to perform the function of relaying and/or receiving media content to ISP network 132 or to other networks. One or more of the computing devices 130 can also serve herein as an application server, a channel service catalog service (server), an ad storage server, an ad delivery server, an IPTV billing system server among other server applications.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

In one embodiment, the building 102 can have a surveillance system 180 including various security devices such as security cameras, motion detectors, automated door locks, intercoms, processors and so forth. Each of the units and/or subscribers within the building 102 can have a cognitive radio transceiver (CRT) 175 that can wirelessly receive and send signals to and from the surveillance system 180. The signals can be video media captured by security cameras throughout the building (such as at the front door, the pool, and so forth).

Figure 2:
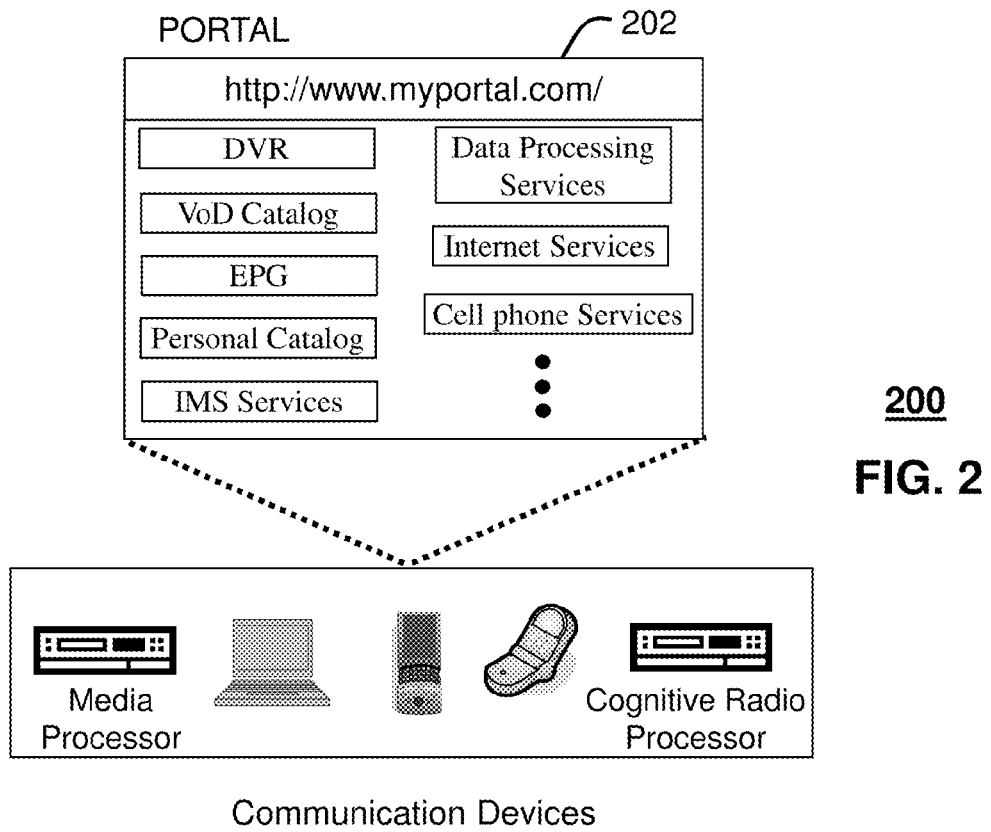
FIG. 2 depicts an illustrative embodiment of a portal interacting with the communication system of FIG. 1.

FIG. 2 depicts an illustrative embodiment of a portal 202 which can operate from the computing devices 130 described earlier of communication system 100 illustrated in FIG. 1. The portal 202 can be used for managing services of communication system 100. The portal 202 can be accessed by a Uniform Resource Locator (URL) with a common Internet browser such as Microsoft's Internet Explorer™ using an Internet-capable communication device such as those described for FIG. 1. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services, provisioning Internet services, provisioning cellular phone services, provisioning services such as security services or advertising services and so on. For example, a user can utilize the portal to process measurement data retrieved remotely by a portable device and uploaded to the portal using a set top box for example. In another embodiment, the processed data or alerts can be forwarded to other communication devices and/or entities, such as a mobile telephone of the user.

Figure 3:
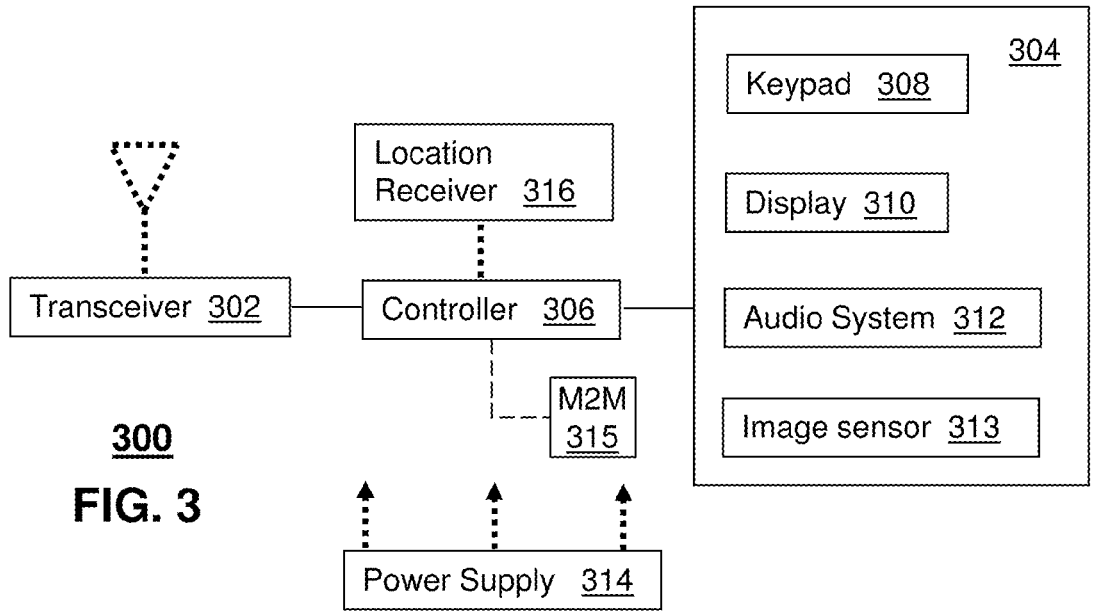
FIG. 3 depicts an illustrative embodiment of a communication device utilized in the communication system of FIG. 1.

FIG. 3 depicts an exemplary embodiment of a communication device 300. Communication device 300 can serve in whole or in part as an illustrative embodiment of the communication devices of FIG. 1. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 302 can also be adapted to support circuit-switched wireline access technologies (such as PSTN), packet-switched wireline access technologies (such as TCPIP, VoIP, etc.), and combinations thereof. The communication device 300 can also include a Machine-to-Machine (M2M) chipset or interface 315 allowing the communication device to communicate with other devices having a similar M2M interface or chipset such as a STB having an M2M interface.

Machines and devices can have wireless connectivity enabled by connecting a standalone M2M communication terminal, by integrating a wireless M2M module, or through integrating wireless chipsets at the design stage. Fully approved and certified standalone M2M communication terminals are designed to fit projects where the available integration time is short, when upgrading existing applications with wireless connectivity or when the production volume is low. M2M means "Machine-to-Machine". The term is used to refer to machine-to-machine communication, i.e., automated data exchange between machines.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 300 based on signals generated by a constellation of GPS satellites, thereby facilitating common location services such as navigation.

The communication device 300 can use the transceiver 302 to also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 116 of FIG. 1. It will be appreciated that the communication device 300 can also represent other common devices that can operate in communication system 100 of FIG. 1 such as a gaming console and a media player.

The embodiments herein introduce a new option for consumers to upload and store their medical or fitness measurement data to a Set-Top Box (STB) DVR and/or IPTV storage server. Generally, such an STB like the STB 442 in the system 400 of FIG. 4 can be equipped with a wireless device plug-in port or a built-in Machine to Machine (M2M) chipset 441. If a wireless device port is the chosen model, a scale down version of a cell phone 440 can be plugged to the port on the STB 442 to enable the M2M function. This feature allows the STB to interact with a consumer's cell phone at a remote location. This feature can also serve as a backup channel (see FIGS. 5 and 7) for service providers to provide enhanced video services or perform trouble shooting functions. The STB can also be equipped with Bluetooth (BT) capability to receive data (e.g., medical measurements or fitness measurements) from a Monitoring Gateway device 420. Medical measurements and/or fitness measurements can be uploaded to the DVR 448 of the STB. The data can be further updated to an IPTV storage server 434 located in or coupled to the service providers' network 434 or at a remote data center at server 404.

Personal medical devices and fitness equipment with built-in sensors and wireless chips are getting more popular each day. A variety of these devices are in the market performing different functions. The medical devices that can be incorporated herein can include but are not limited to a Pedometer 421, a Heart Rate Monitor 422, a Blood Pressure Monitor 423, a Pulse Oximeter 424, a scale 425, and a Glucose Meter 426 as an example. Examples of the fitness equipment that can be incorporated herein include but are not limited to Treadmills 432, Steppers 431, Bikes 430, Ellipticals 428, Rowers 429, and other fitness equipment 427 that can provide measurement data.

Most of these medical or fitness devices can hold measurement data from hours to a few days, but embodiments herein enable the uploading of these measurements for more permanent storage and for doing statistical analysis. A PDA, Cell phone or Medical Data Gateway can obtain the measurement data via a cable or Bluetooth connection to the medical devices or fitness equipment. In some existing systems measurements can be permanently uploaded from the intermediate storage device (e.g., PDA, Cell Phone, Medical Gateway, etc.) to a personal computer or a healthcare Internet web site such as Google Health. The connection between the Personal Computer and the intermediate device can be either a cable wire or a Bluetooth connection. However, when the Internet or a remote location is involved, a broadband wireline connection (e.g., DSL, Cable Modem) or M2M wireless connection (e.g., 2G or 3G data plan) should be used.

The current solutions work fine in most cases but did not take into consideration of some special group of users and do not make use of an STB. For example, users who live in a nursing complex and does not have a computer in their room, or users who only subscribe to TV and voice services but do not subscribe to High Speed Internet Services, or who care very much of privacy issues and do not want the data to be posted in the Internet domain, or users who do have mobile and Internet services but prefer to use TV as an alternative way to handle medical data at home.

In existing systems, users might purchase and use a variety of medical devices to measure specific healthcare related data. These devices can store measurement data from few hours to a few days. Such users might have fitness equipment (either their own or the ones in fitness centers) that can store measurement data from a few hours to a few days per user session. As discussed previously, the measurements above can be uploaded to a PDA, Cell Phone or a Monitoring Gateway as the interim storage device via a cable connection, Bluetooth connection or other sensor technologies (e.g., ANT, Zigbee, etc.). These measurements can be uploaded to a personal computer via a cable wire or Bluetooth connection or can be viewed on a TV screen with the source directly from the Monitoring Gateway. Measurement data can be further uploaded to online storage via wireline or wireless Internet connection. Online measurements can be accessed by authorized people or applications.

FIGS. 4-7 depict illustrative embodiments of a system or method or flow 400, 500, 600, or 700 respectively for enabling a subscriber to receive or retrieve measurement data and optionally have a back-up communication channel using a suitably enabled STB and wireless communication device such as a cellular phone. The embodiments herein enhance a TV and Set-Top centric platform for the storage and analysis of personal measurement data. Consumers can continue to use all features provided in an existing environment (401) that has data accessed 402 by authorized users or applications external to the home premises from an online personal measurement record 402 obtained from the portable monitoring gateway 420 via a computer 418 or cellular phone 416 and sent via any number of networks 406, 408 or 410 to the record 404.

Figure 4:
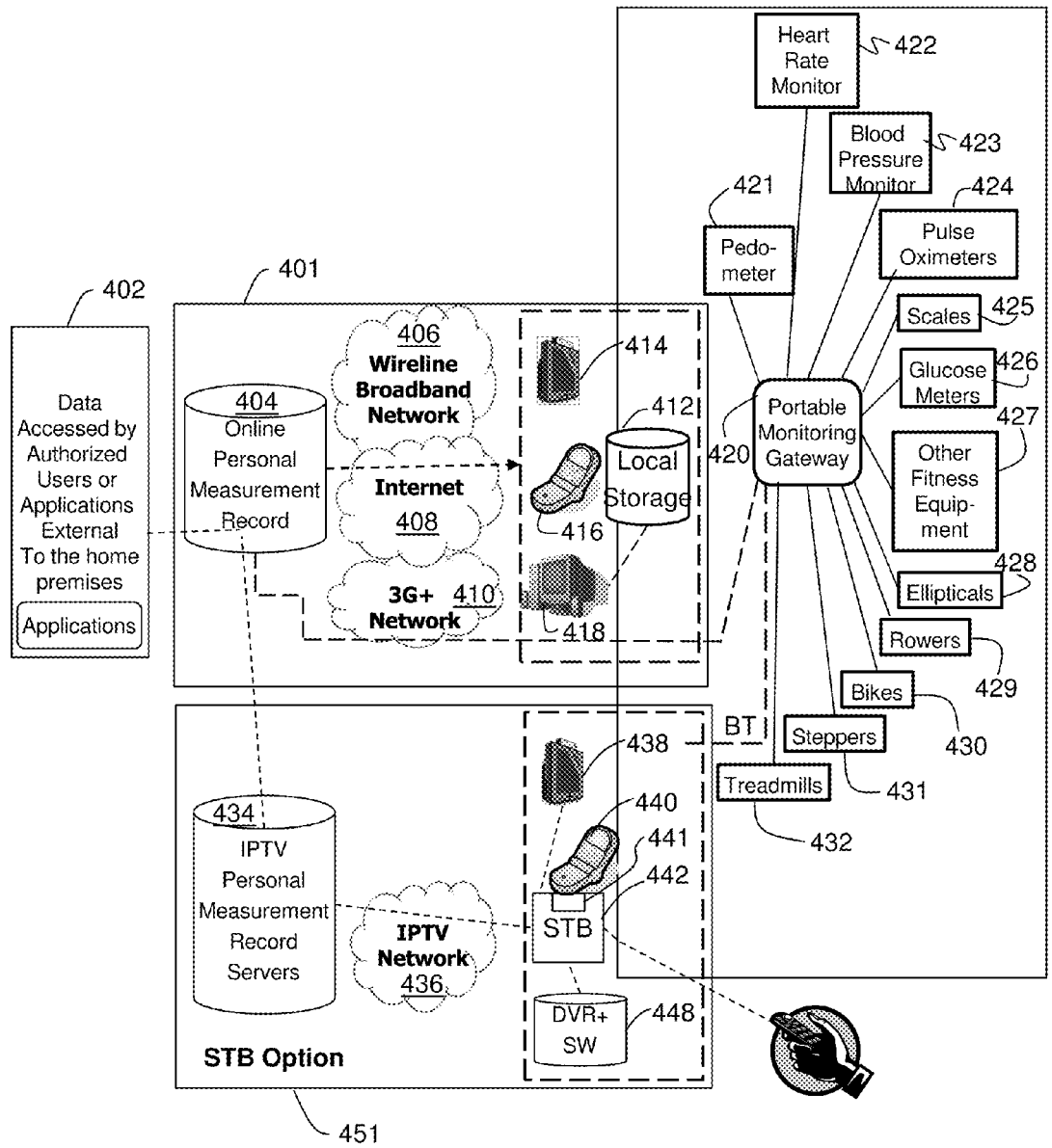
FIG. 4 depicts another illustrative embodiment of a communication system utilized for receiving measurement data using an STB.

The embodiments herein provide a new option or environment 451 to an existing solution to enable the special group of users described above (nursing home residents without computers, etc.) and others to use an STB for a number of new functions. FIG. 4 illustrates this TV/STB centric measurement data management model where all existing capabilities can remain intact (as 401 depicts) and new enhancements are added. For example, an STB at the premises can be enhanced to include the following optional features:

(1) A Built-in M2M Chipset or a Built-in Wireless Connector Option (442):
  a. Built-in M2M Chipset—this option allows the STB to have built-in M2M capability.
  b. Built-in wireless connector—this option allows a wireless device (e.g., a cell phone) with M2M capability to be plugged into the connector to allow STB to make use of the M2M function.
(2) A Built-in Mini LCD Screen and Speakers:
  a. Built-in Mini LCD Screen (see 530 or 630 or 730 in FIG. 5 or 6 or 7 respectively)—this option allows the STB to have visual capability without turning on a TV set.
  b. Built-in Speakers (see 631 in FIG. 6)—this option equips the STB with audio capability without turning on a TV set.
(3) A Built-in Bluetooth Chipset:—this Option Allows the STB to have Data uploading capability from a Monitoring Gateway device.
(4) A Built-in Measurement Analytical Software Package (See 448 in FIG. 4, 632 in FIG. 6, or 732 in FIG. 7)—this option allows the STB to have local analytical and reporting functions to handle the data stored in the DVR or remote data servers.

Referring again to the system 400 of FIG. 4, the IPTV platform at the network/data centers can be enhanced to include an IPTV Personal Measurement Record Server 434 which can be hosted within an IPTV secured private network cloud. The personal measurement data can be uploaded from each consumer's STB 442. The system 400 can further include an analytical & reporting software package 448. The package 448 can be used to manage and generate statistics for the personal measurements. Alerts can be triggered when certain threshold settings are reached. The record server 434 can also communicate with an IPTV private network and Internet online record interface. This option allows the IPTV personal measurement record server 434 to import or export certain data sets to public online space such as the online personal measurement record 404. Data in this online space can then be accessed by an authorized user/application 402. All personal record access requests can be logged.

Another feature enabled by the IPTV network and STB is the IPTV to STB alert option. For example, when a doctor wants to alert a patient or when an urgent incoming request wanting to access a private space data record, an alert can be sent from an IPTV server to the STB at the premise of the STB owner. The STB will use either an audio or visual (LCD screen) or coupled display (438) to alert the customer of an incoming request. The consumer can respond to the alert by accepting the alert request or by rejecting the alert request. If an alert is not dealt with in a certain time period, the alert can be relayed to a consumer's cell phone with the M2M communication path (i.e., a phone message will be placed to the designated phone number/ip address) to contact the consumer.

Other variations of the embodiments can include the portable monitoring gateway 420 as the plugged in M2M wireless device. The service provider can choose to standardize the wireless device plug-in port on the STB. This allows a Monitoring Gateway manufactured from the third party company to be plugged into the STB port to act as the M2M gateway. In this situation, there is one less device needed in the home premises. In yet another variation, a cell phone can be equipped with the Monitoring Gateway and M2M capabilities as the plug-in wireless device. In this situation, there will be one less device needed at home premises. In yet another variation, two cell phones can be equipped with the Monitoring Gateway and M2M capabilities which can be sold in a product bundle to the consumer. One cell phone can be plugged into the STB port and the other cell phone can be used as a supplemental remote control unit at home or as the Monitoring Gateway device. When being used as a Monitoring Gateway, it can transmit gathered measurements remotely (longer range than Bluetooth allowed) via the M2M wireless connection to the cell phone device on top of the STB.

Figure 5:
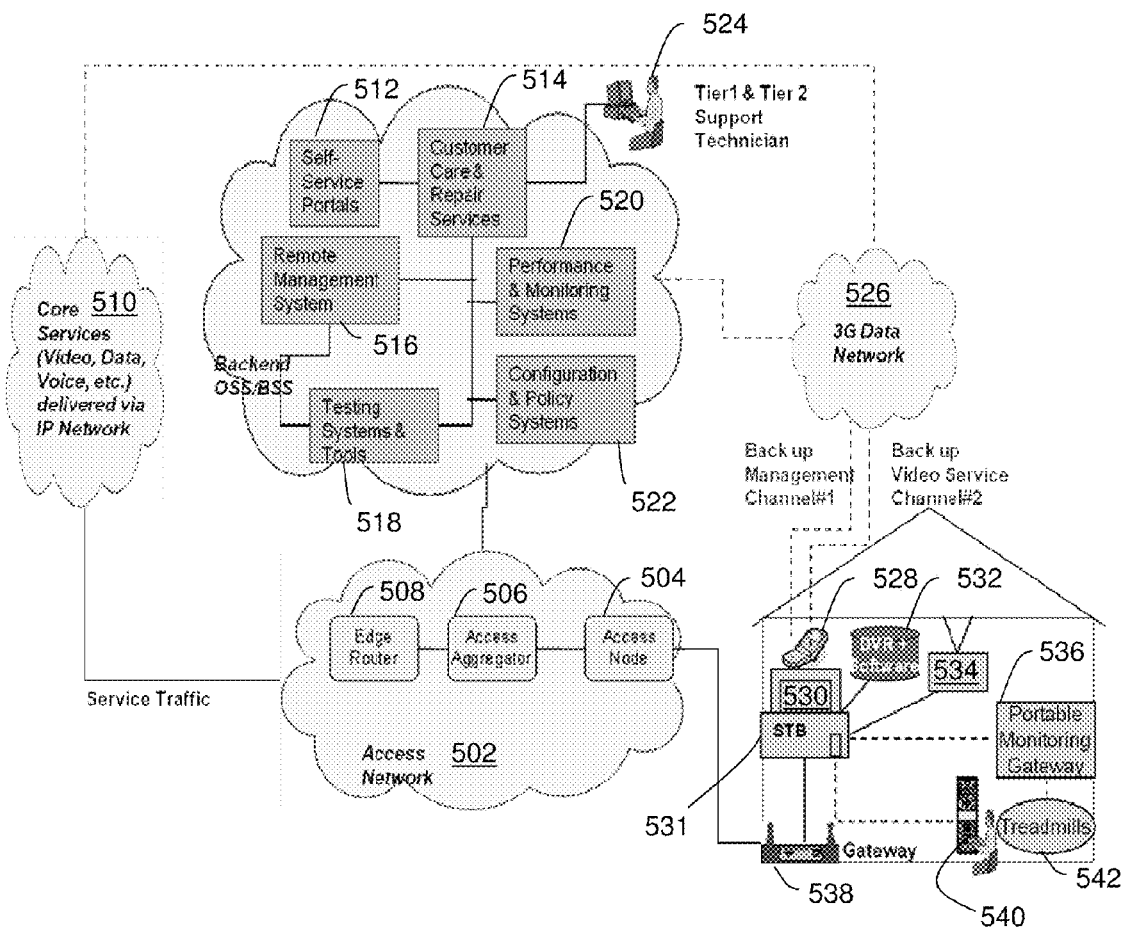
FIG. 5 depicts another illustrative embodiment of a communication system for receiving measurement data and providing back-up communication services.

Referring to FIG. 5, a communication system 500 can include an access network 502 having an access node 504, an access aggregator 506 and edge router 508. The access node 504 communicates with a residential gate way 538 at a premise. Core services such as video, data, and voice can be delivered to the premise via an IP Network 510 or a 3G data network 526. Management and support or backend OSS/BSS services (having self service portals 512, customer care and repair services 514, remote management systems 516, testing systems and tools 518, performance and monitoring systems 520, and configuration and policy systems 522 as well as live technical support capabilities 524) can also be provided through either network 510 or 526.

Within the premise, an STB 531 equipped M2M capability can enable back-up channels through the 3G data network 526 (or other wireless network) to perform trouble shooting & back-up video service functions. These functions, even though designed to benefit the transmission of personal measurement data can also be used as a way to backup the TV video viewing channel. Further included within the premise can be a medical monitoring device or an exercise device such as a treadmill 542 coupled to a portable monitoring gateway 536. The gateway 536 can communicate with the STB 531 and measurement data can be viewed either on a built-in display 530 or TV display 534 coupled to the STB 531. The STB can be remotely controlled using the controller 540. The STB can have a DVR and software 532 for analyzing and processing measurement data.

The STB 531 at the premises can include a back-up management channel using the wireless communication device or cell phone 528. When the video services are not functioning and the link from the Home Gateway 538 to the network is not available, the STB 531 equipped with M2M capability will enable to set up a wireless management channel for customer or s service provider tier 1/tier 2 technician to perform trouble shooting functions. Additional, the STB 531 can also include a back-up video service channel. When the video service is not available or a special program is not available in local video office, the STB 531 equipped M2M capability can enable to set up a wireless video service channel for a customer to view a "cannot miss" video program. Furthermore, for the personal measurement data in the IPTV private domain, the consumers can continue to view or update them via this wireless channel.

Figure 6:
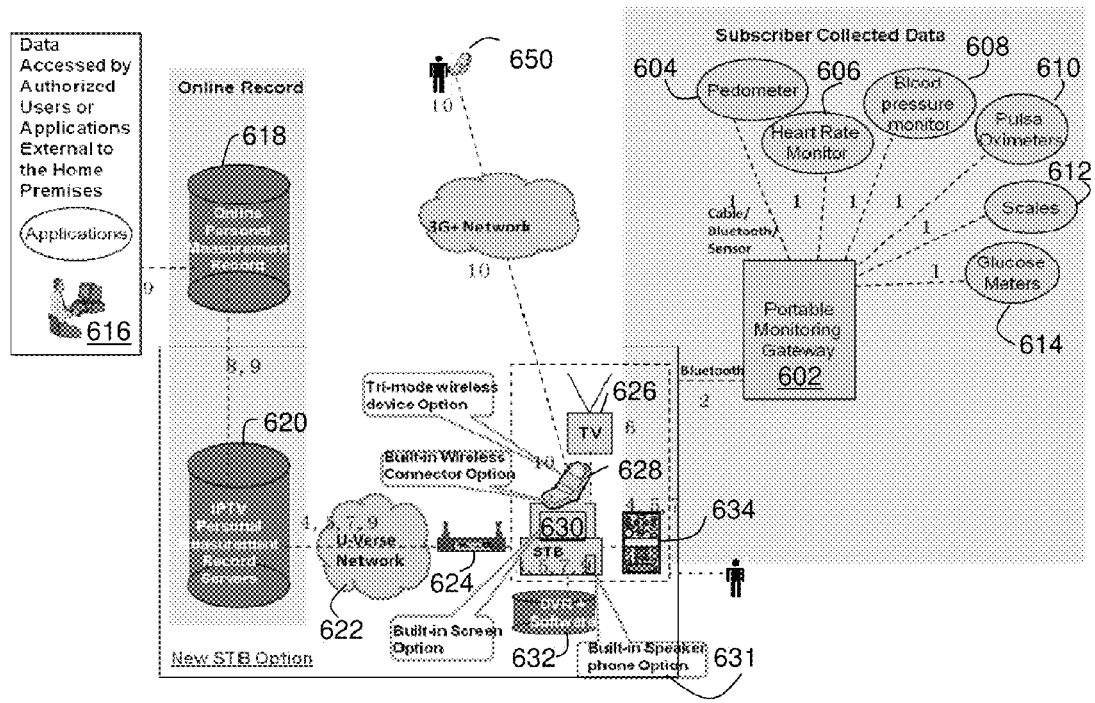
FIG. 6 depicts another illustrative embodiment of a communication system for receiving measurement data.

Referring to FIG. 6, a use case is illustrated where a user uploads medical measurements & views the statistical result via a TV channel using the STB 631 in the system 600. The user can be alerted at a remote location 10 when a doctor requests a private data set. In such a system, a subscriber can subscribe to an IPTV and cell phone bundled service with options where the STB 631 is equipped with a wireless device plug-in port, a built-in LCD screen 630 and a built-in speaker phone. The services can also include regular IPTV services with the measurement data management option and two cell phones (628 and 650) that both support M2M capabilities. The subscriber in such a system collects measurements from various medical devices (for example, pedometer 604, heart rate monitor 606, blood pressure monitor 608, pulse oximeter 610, scale 612, or glucose meter 614) and uploads the data to the STB & IPTV server via a portable monitoring gateway 602. The subscriber then selects (using remote 634) and views (on display 626 or 630) the statistical report from a TV channel. When the subscriber is away from the home, the subscriber can receive a M2M alert after the subscriber's doctor requests to view one data set still stored in the private domain. As in previously described systems, the system 600 can also include a DVR and software module 632, a residential or home gateway 624 that communicates with an IPTV personal measurement record server 620 via an IPTV network 622. Data can be accessed by authorized users or application at 616 from an online person measurement record server 618 which can communicate with the server 618.

A detailed process flow description can include the following numerated steps as annotated in FIG. 6:

1. The subscriber does daily medical measurements using various medical devices. The subscriber uses a third party Portable Monitoring Gateway 602 as the interim storage to gather individual measurements from these medical devices (604-614).
2. At home premises, the subscriber is ready to upload the gathered measurements to the DVR 632 in the STB 631 via a Bluetooth interface.
3. The gathered data is successfully uploaded to the STB DVR. The LCD screen 630 of the STB is used to monitor the progress of the measurement data uploading.

4. The subscriber uses the remote control 634 to choose to further upload the measurement data to the IPTV server 620 located in the service provider's network/data center.
5. The subscriber is ready to view the statistical report of the aggregated data set by using the remote control unit 634.
6. The subscriber uses the remote control 634 to select the personal measurement viewing channel by entering a personal PIN code. The measurement data whether raw or aggregated is display on TV 626 or display 630.
7. The subscriber uses the remote control 634 to move a selected set of personal measurement data to "Public Domain" or 618.
8. The selected set of measurement results are available to be accessed by authorized users/applications at 616.
9. The subscriber's doctor reviews the subscriber's public data set and determines to include his weekend data which has not yet been push to the public data domain 618. An alert is delivered to subscriber's STB 631. A visual message is displayed on the native LCD screen 630 and an audible beep is delivered to the speaker.
10. After a pre-set threshold time, the M2M of the cell phone 628 (on top of the STB) sends an alert to the subscriber at a remote location at cell phone 650.

Figure 7:
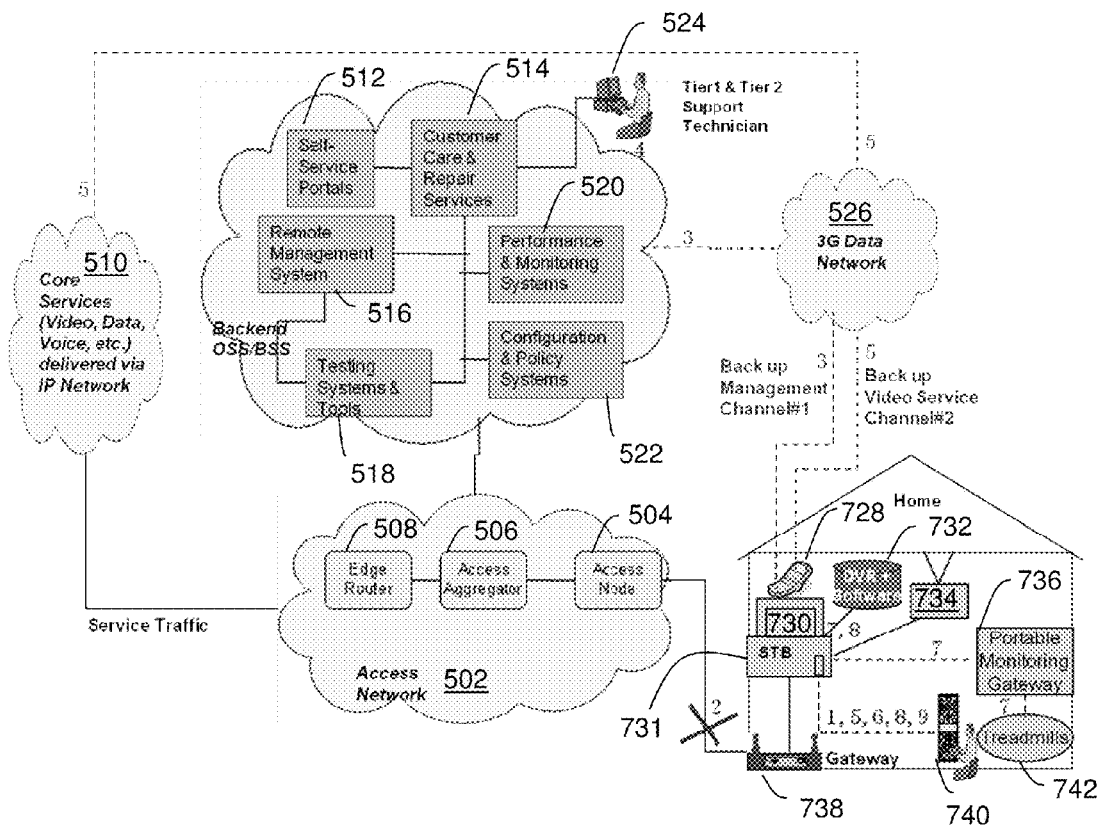
FIG. 7 depicts another illustrative embodiment of a communication system for receiving measurement data and providing back-up communication services.

Referring to FIG. 7, a use case in a system is illustrated where a subscriber in a system 700 is experiencing an unexpected outage and loses their wireline connection. The system 700 is similar to the system 500 previously described with respect to FIG. 5. The STB 731 can detect an outage and request an M2M module to establish a back-up management channel to enable a trouble shooting process. A back-up video service channel is also enabled to allow limited access of video services.

A detailed process flow description can include the following numerated steps as annotated in FIG. 7:
1. The Subscriber is enjoying watching a VoD movie on TV 734 whiling exercising on a home treadmill equipment 734 at home premises.
2. A service outage occurs which causes the subscriber to lose the video services. This service outage stops the home gateway 738 to WAN communications; therefore, the self service and agent assisted trouble shooting mechanisms are disabled.
3. The STB 731 immediately requests the M2M module to establish a back-up management channel using cell phone 728. This channel connects to the service provider's OSS/BSS domain. The subscriber can use TV remote control 740 to do trouble shoot alone.
4. Optionally, the subscriber can demand for a technician's (524) assistance. In either case, the trouble shooting tool (518) in the WAN side of the domain can start the trouble isolation process.
5. The subscriber uses the remote control 740 to request establishment of a back-up video service channel to resume the VoD transaction.
6. The subscriber completes the treadmill exercise and uses the remote control unit 740 to pause the VoD program.
7. The subscriber uploads the treadmill readings to STB VOD via a Monitoring Gateway 736.
8. The subscriber uses remote control 740 to switch to a measurement data management channel to view aggregated reports.
9. The subscriber uses remote control unit 740 to switch back to the VoD channel and resume the VoD transaction.

Upon reviewing the aforementioned embodiments, it would be evident to an artisan with ordinary skill in the art that said embodiments can be modified, reduced, or enhanced without departing from the scope and spirit of the claims described below. For example, such a system and method can entail in a particular embodiment a STB or server which can ultimately process measurement data either alone or in combination in a similar fashion as discussed above where the IPTV system is further coupled to a wireless network and remote devices as illustrated in the various figures herein. Further note that a cell phone in various embodiments can serve as a temporary storage of measurement data, a portable monitoring gateway, a means for providing a back up management channel or a back-up video service channel, or a means for alert another remote device such as another cellular phone.

Other suitable modifications can be applied to the present disclosure without departing from the scope of the claims below. Accordingly, the reader is directed to the claims section for a fuller understanding of the breadth and scope of the present disclosure.

Figure 8:
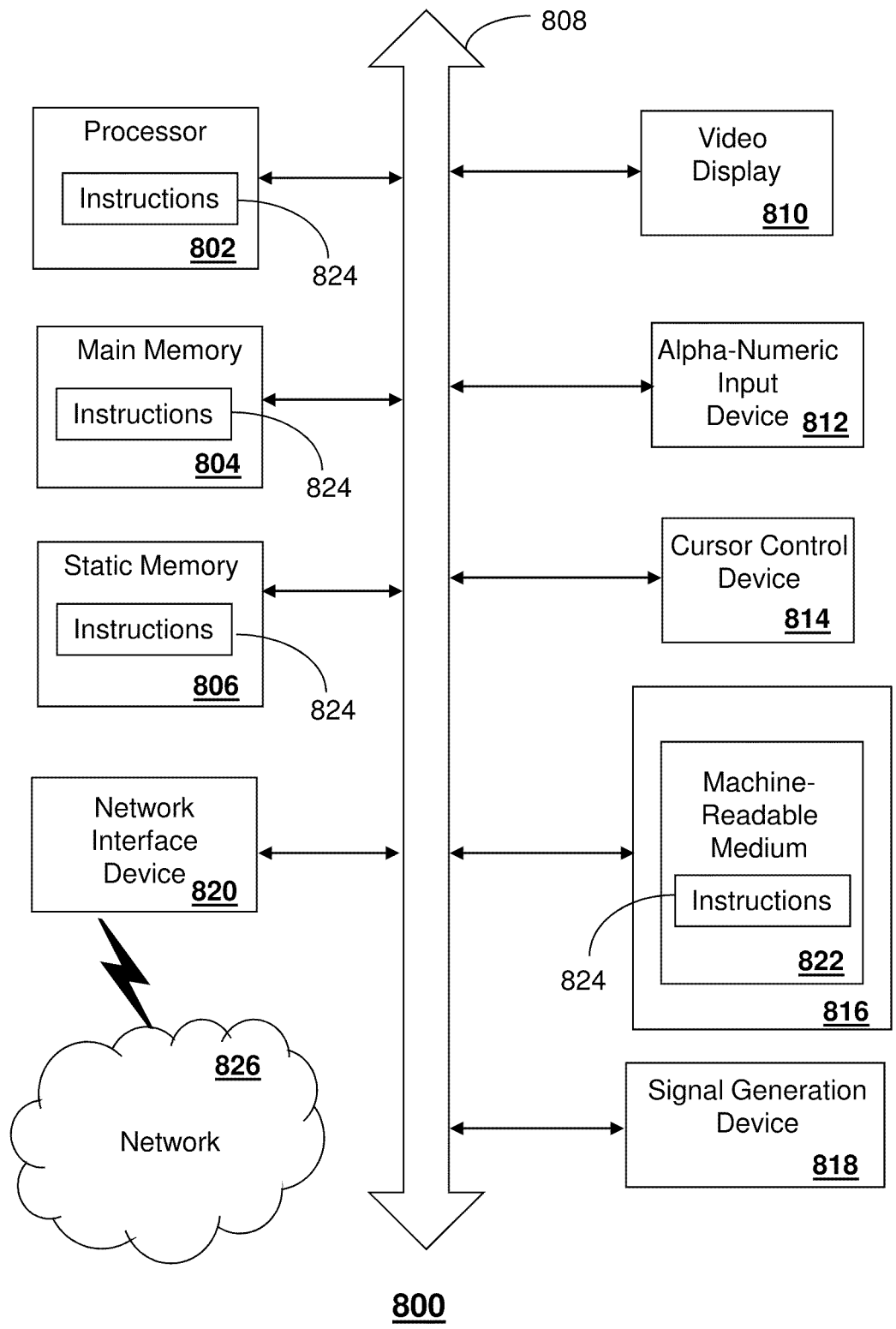
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A tangible computer-readable storage device comprising instructions which, when executed by a processor operating in a set top box, cause the processor to perform operations comprising:
receiving measurement data stored in a first wireless device serving as a portable monitoring gateway that collects subscriber collected data;
analyzing the measurement data at the set top box using the received measurement data received from the first wireless device and optionally from a remote server or a local storage space having stored measurement data to provide analyzed results;
presenting the analyzed results at the set top box;
uploading the measurement data to a measurement record server; and
transferring a selected set of the measurement data to a public data domain of an online record server,
wherein the portable monitoring gateway provides interim storage for the subscriber collected data and the set top box has a built-in machine-to-machine connection for connecting to the first wireless device,
wherein the selected set of the measurement data is accessible by a live health care provider external to premises of a subscriber, and
wherein the set top box presents the analyzed results using a built in display or built-in speaker.

2. The tangible computer-readable storage device of claim 1, wherein the first wireless device is a cellular phone, a personal digital assistant, or a medical data gateway.

3. The tangible computer-readable storage device of claim 1, wherein the measurement data stored in the first wireless device is received by the set top box using a Bluetooth connection.

4. The tangible computer-readable storage device of claim 1, wherein the set top box presents the analyzed results in response to a code entry.

5. The tangible computer-readable storage device of claim 1, wherein the operations further comprise enabling access by the live health care provider to measurement data in a private data domain of the measurement record server.

6. The tangible computer-readable storage device of claim 1, wherein the machine-to-machine connection facilitates connecting to a second wireless device.

7. The tangible computer-readable storage device of claim 1, wherein the set top box operates on an Internet Protocol Television (IPTV) network and wherein the operations further comprise enabling a back-up management channel for troubleshooting and a back-up video channel for back-up video service functions using the machine-to-machine connection or a wireless cellular connection.

8. The tangible computer-readable storage device of claim 6, wherein the second wireless device is a cellular phone and wherein the storage device comprises computer instructions to enable a back-up channel for the set top box to perform troubleshooting and back-up video service functions.

9. A set top box comprising:
a memory to store instructions; and
a controller coupled to the memory, wherein responsive to executing the instructions, the controller performs operations comprising:
receiving measurement data stored in a first wireless device serving as a portable monitoring gateway that collects subscriber collected data; and
storing and analyzing the measurement data at the set top box using the received measurement data received from the first wireless device and optionally from a remote server or a local storage space having stored measurement data to provide analyzed results;
uploading the measurement data to a measurement record server; and
moving a selected set of the measurement data to a public data domain of an online record server,
wherein the portable monitoring gateway provides interim storage for the subscriber collected data and the set top box has a built-in machine-to-machine connection for connecting to the first wireless device,
wherein the selected set of the measurement data is accessible by a live health care provider external to premises of a subscriber, and
wherein the operations further comprise enabling a back-up management channel for troubleshooting and a back-up video channel for back-up video service functions using the machine-to-machine connection or a wireless cellular connection.

10. The set top box of claim 9, wherein the set top box has a built-in display to present the analyzed results at the set top box without the use of a television set.

11. The set top box of claim 9, wherein the set top box has a built-in speaker to present the analyzed results at the set top box.

12. The set top box of claim 9, wherein the set top box comprises a built-in machine-to-machine chipset enabling the first wireless device or a second wireless device to communicate using a machine-to-machine function.

13. The set top box of claim 9, wherein the controller is programmed to analyze and report measurement data to an internet protocol television personal measurement record server.

14. The set top box of claim 9, wherein the operations further comprise receiving measurement data via the portable monitoring gateway from a pedometer, a heart rate monitor, a blood pressure monitor, a pulse oximeter, a scale, a glucose meter, an elliptical machine, a rower, a bike, a stair stepper, or a treadmill.

15. The set top box of claim 9, wherein the controller operates on an internet protocol television network.

16. A network device comprising:
a memory to store instructions; and
a controller coupled to the memory, wherein responsive to executing the instructions, the controller performs operations comprising:
receiving measurement data from a set top box previously stored in a first wireless device serving as a portable monitoring gateway that collects subscriber collected data;
analyzing the measurement data and any previously aggregated data at the network device to create analyzed results;
sending the analyzed results to the set top box in response to a code entry at the set top box;
storing the measurement data at a measurement record server; and
moving a selected set of the measurement data to a public data domain of an online record server,
wherein the portable monitoring gateway provides interim storage for the subscriber collected data and the set top box has a built-in machine-to-machine connection for connecting to the first wireless device,
wherein the selected set of the measurement data is accessible by a live health care provider external to premises of a subscriber, and
wherein the network device enables access by the live health care provider to measurement data in a private data domain of the measurement record server.

17. The network device of claim 16, wherein the first wireless device is a cellular phone, a personal digital assistant, or a medical data gateway and wherein the measurement data stored in the first wireless device is received by the set top box using a Bluetooth connection.

18. The network device of claim 16, wherein the set top box presents the analyzed results using a built in display or built-in speaker.

19. The network device of claim 16, wherein the machine-to-machine connection facilitates connecting to second wireless device and wherein the second wireless device is a cellular phone and wherein the set top box enables a back-up channel for the set top box to perform troubleshooting and back-up video service functions.

20. The network device of claim 18, wherein a second wireless device coupled to the set top box sends an alert to the subscriber in response to granting access to the live health care provider.

* * * * *